United States Patent [19]

Nogues

[11] Patent Number: 4,822,688

[45] Date of Patent: * Apr. 18, 1989

[54] ADHESIVE COMPOSITIONS BASED ON POLYPROPYLENE MODIFIED BY GRAFTING AN UNSATURATED MONOMER

[76] Inventor: Pierre Nogues, Residence St. Germain, Blvd. de Normandie, 27000 Evreux, France

[*] Notice: The portion of the term of this patent subsequent to Apr. 5, 2005 has been disclaimed.

[21] Appl. No.: 64,332

[22] Filed: Jun. 19, 1987

Related U.S. Application Data

[63] Continuation of Ser. No. 792,519, Oct. 29, 1985, Pat. No. 4,727,120.

[30] Foreign Application Priority Data

Oct. 30, 1984 [FR] France ................. 84 16568

[51] Int. Cl.$^4$ .............. B32B 15/08; B32B 27/08; C08F 255/02

[52] U.S. Cl. .................. 428/458; 428/461; 428/474.4; 428/475.5; 428/523; 525/66; 525/181; 525/184; 525/285

[58] Field of Search ............ 525/66, 181, 184, 285; 428/458, 461, 474.4, 475.5, 523

[56] References Cited

U.S. PATENT DOCUMENTS 4,146,590 3/1979 Yamamoto .................. 525/181
4,735,992 4/1988 Nogues ..................... 525/64

Primary Examiner—Patricia Short
Attorney, Agent, or Firm—Burgess, Ryan and Wayne

[57] ABSTRACT

Adhesive composition consisting essentially of polypropylene modified by grafting with an acid anhydride to further reacted with a compound bearing at least two groups capable of reacting with the anhydride preferrably a polyol or a polyamine.

14 Claims, No Drawings

ADHESIVE COMPOSITIONS BASED ON POLYPROPYLENE MODIFIED BY GRAFTING AN UNSATURATED MONOMER

This is a continuation of application Ser. No. 792,519, filed on Oct. 29, 1985, now U.S. Pat. No. 4,727,120.

BACKGROUND OF THE INVENTION

Polypropylenes grafted with an unsaturated monomer bearing an acid anhydride group are known for their adhesive properties which are attributed to the polar groups contributed by this monomer.

It is also known that a restricted concentration of these polar groups is sufficient to impart good adhesive properties to many substrates. However, for reasons of convenience in use, grafted polypropylenes (PPgs) can be diluted in a polyolefin (U.S. Pat. No. 3,856,889). The mixtures have the advantage of the good physical and mechanical properties of the diluent polyolefin and are better in this respect than the PPgs which they contain.

Attempts have been made to increase the adhesive properties of polypropylene grafted with maleic anhydride; thus, with this aim in mind, Japanese Application No. 80/40,396 of Mar. 31, 1980, Publ. 81,136,833 claims the addition of an epoxidized fatty acid glyceride to this polymer.

SUMMARY OF THE INVENTION

We have found that it is possible to greatly increase the adhesive properties of PPgs, alone or mixed with one or more polyolefins, by adding to them a compound, which may be polymeric, bearing at least two groups, which may be identical and which are reactive with the acid anhydride group.

DETAILED DESCRIPTION OF THE INVENTION

The compounds which are reactive with the acid anhydride group will be referred to hereinafter as "compound R", and may have at least two alcohol groups, at least two amine groups or at least one of an alcohol group and an amine group.

The compound can be a diol, a triol, a tetraol or the like, a diamine, a triamine, a tetraamine or the like, or a compound containing an alcohol group and an amine group or two amine groups and an alcohol group or two alcohol groups and an anine group and the like.

By "grafted polypropylenes" (PPgs) we mean any propylene homopolymer or copolymer with various monomers (whether they be block or random, provided that the copolymer contains at least 50 mol% of propylene) on which a monomer bearing an acid anhydride group has been grafted.

The grafting monomer is a compound bearing at least one double bond which is active in radical polymerization and at least one five-centred cyclic acid anhydride group.

By way of illustration, the grafting monomer can be maleic, citraconic, 2-methylmaleic, 2-chloromaleic, 2-carbomethoxymaleic, 2,3-dimethylmaleic, 2,3-dichloromaleic, 2,3-dicarbomethoxymaleic, bicyclo[2.2.1]hept-5-3n3-2,3-dicarboxylic, and 4-methylcyclohex-4-ene-1,2-dicarboxylic anhydride, and the like. The list is provided by way of illustration and is not intended to be limiting in any way.

The invention applied to PPgs, whatever their molecular weight.

Many methods have been proposed for producing PPgs.

Active sites may be prepared on the polypropylene chain by treatment with initiators of the peroxide or diazo type, or by electromagnetic treatment. The active sites are sites on which the anhydride will be grafted via a radical route.

The polypropylene may be preactivated in a first step independently of the grafting and, in a second step, the preactivated polypropylene may be brought into contact with the grafting monomer.

Activation and grafting may also be carried out simultaneously by subjecting a suspension of polypropylene powder in a liquid or a solution of polypropylene in a suitable solvent (U.S. Pat. No. 2,970,129) to the action of a peroxide; it is also possible to operate in a gas stream (U.S. Pat. No. 3,414,551). The liquid, solvent or gas stream contains the appropriate quantity of the grafting monomer as defined above.

It is also possible to operate in a molten state.

Among the useful compounds R, containing at least two alcohol groups are: ethylene glycol, propylene glycol, 1,3-butanediol, 1,4-butanediol, 1,6-hexanediol, 1,4-but-2-enediol, 4-(2-hydroxyethoxy)-1-butanol, 1,2,6-hexanetriol, erythritol, sucrose, glucose, dihydroxyacetone, polyoxyalkylene glycols such as polyoxyethylene glycols, polyoxytetramethylene glycols of different molecular weights, hydroxylated derivatives of ethylene/vinyl acetate copolymers, copolymers of ethylene witha comonomer bearing an alcohol group such as hydroxyethyl acrylate, and the like. The list is illustrative only and is not limiting in any way.

Among the useful compounds R, containing at least two amine groups are:

alpha,omega-diamino polyamide oligomers of various molecular weights, obtained by polycondensation, in the presence of a diamine, of a monomer giving rise to a polyamide, such as a salt of a diacid and a diamine (for example AH salt), an amino acid, a lactam such as caprolactam, lauryllactam, and the like.

Particularly suitable are:

alpha,omega-diamino polyamide 11 or 12 oligomers, the sythesis of which are described in French Patent Applications Nos. 83/15,859 and 84/13,244 in the name of the Assignee Company, the contents of said applications are incorporated herein by reference.

alphatic or aromatic diamines such as hexamethylenediamine, nonamethylenediamine, undecamethylenediamine, dodecamethylenediamine, meta-xylylenediamine, bis-p-amino-cyclohexylmethane, and the like.

The respective quantities of the two main constituents PPg and compound R which react together to give the adhesive compositions according to the invention will be such that their molarity ratio, MR, defined as follows:

$$MR = \frac{\text{Concentration of reactive groups carried by } R}{\text{Concentration of acid anhydride groups carried by the } PPg}$$

$$= \frac{\text{Number of reactive groups in } R}{\text{Number of acid anhydride groups in the } PPg \text{is}}$$

between 0.01 and 5 and, preferably, between 0.1 and 2, one acid anhydride group corresponding to two carboxylic acid groups.

The preparation of the adhesive compositions according to the invention can be carried out by simple melt-compounding of the grafted polypropylene, alone or mixed with a polyolefin, with the compound R.

The dliuent polyolefin can be a propylene homopolymer, a block or random propylene/ethylene copolymer, or high density or low density polyethylene.

Any apparatus for converting plastics which ensures good compounding is suitable, for preparing the adhesive composition of the present invention. Devices such as Buss or Brabender mixers, a single-screw extruder, or a double-screw extruder of the Werner and Pfleiderer type are useful. It is possible to carry out the operation in a simple autoclave.

The converting devices can be fed with the two or three constituents (PPg with or without a polyolefin and R) delivered separately, or as a mixture, prepared beforehand by simple tumble-mixing or in a dry-mixing device.

Fillers, colorants, and additives providing protection against aging by light, heat stabilizers, and the like can be introduced into the converting device along with the other constituents.

The compounding takes place at temperatures between 160° and 250° C., preferably between 180° and 210° C.

The reaction between PPg and compound R is fast. The reaction can be followed by infrared spectrography, by observing the characteristic vibration of the ester group at 1730 cm$^{-1}$ when the compound R is an alcohol, or that of the amide group at 16050 cm$^{-1}$ in the case of an amine-containing compound R.

The adhesive forces obtained with the new compounds are measured as follows:

polymer granules are arranged between two sheets of aluminum, 100 microns in thickness. The two sheets of aluminum with the polymer granules between them are placed between two plates heated at a temperature of 200° C.; a pressure of 4 bars is then applied for 5 minutes. The assembly is taken out and allowed to cool.

After cooling, specimens 2 cm in width are cut out and T-peel tests are carried out by pulling the aluminum sheets at a speed of 50 mm/minute by means of a tensometer at ambient temperature.

The adhesive compositions according to the invention can be employed for gluing materials other than the aluminum referred to above. Materials such as steel, copper, corrugated cardboard, wood, leather, cork, as well as plastics can be glued by use of the composition of the present invention.

The following examples are by way of illustration and are not intended to be limiting in any way.

EXAMPLE 1

Maleic anhydride was grafted onto a polypropylene homopolymer in the following manner:
the following were introduced into an autoclave:
440 g of monochlorobenzene
96 g of Lacqtene 3050 FNI (polypropylene sold by ATOCHEM - melt index, ASTM D 1238 at 230° C. under 5 kg, equal to 5)
8 g of maleic anhydride
8.2 g of benzoyl peroxide.

The mixture was maintained at a temperature of 130° C. for 3 hours and a 1.9% grafted PP was obtained, with a melt index of 56, measured at 190° C. under 325 g.

The following were mixed at a temperature of 178° C. for 10 minutes in the tank of a Brabender mixer:
40.5 g of Lacqtene 3050 FNI
approximately 4.5 g of the PPg obtained above alone or with the addition either of a monoalcohol: 1-octanol or a dialcohol : 1,6-hexanediol.

The results obtained are collated in the Table below:

| Adhesive composition, in grams | | | | Molar ratio MR = [OH] [MA] | Peeling force on aluminium in daN/cm |
|---|---|---|---|---|---|
| PP | PPg | Hydroxylated reactant Type | weight | | |
| 40.5 | 4.5 | — | 0 | 0 | 0.27 |
| 40.5 | 4.498 | 1,6-hexanediol | 0.02 | 0.4 | 0.50 |
| 40.5 | 4.498 | " | 0.04 | 0.8 | 0.79 |
| 40.5 | 4.492 | " | 0.08 | 1.6 | 0.81 |
| 40.5 | 4.482 | 1-octanol | 0.18 | 1.6 | 0.29 |

The results show clearly that a monohydroxylated reactant such as 1-octanol has practically no effect on the adhesive properties but that a dihydroxylated reactant such as 1,6-hexanediol substantially improves the adhesive properties.

It should be noted that the addition of the same hexanediol to PP without PPg, does not improve its adhesive properties.

EXAMPLE 2

By employing an operating procedure similar to that of Example 1, 4.1% of maleic anhydride was grafted onto a block propylene/ethylene copolymer sold by ATOCHEM under the name Laqctene P 3050 MN4 (melt index at 230° C. under 5 kg equal to 5).

The grafted copolymer, had a melt viscosity, measured at 200° C., at a shear rate of 10 s$^{-1}$, with a Rheomat 30 apparatus manufactured by the Swiss company Contraves, of 100 Pa s. The grafted copolymer was then melt-compounded, at 180° C., in the tank of the Brabender mixer of Example 1, by itself or with either polyoxytetramethylene glycol (PTMG), or polyoxyethylene glycol (PEG) of different molecular weights, or an alpha,omega-diamino polyamide 11 oligomer with a molecular weight of 1050, obtained by polycondensation of 11-aminoundecanoic acid in the presence of hexamethylenediamine, in accordance with the operating procedure described in French Patent Application No. 84/13,244.

The results collated in the Table below show clearly that the addition of polymers bearing two groups which are reactive with PF grafted with maleic anhydride substantially improves the adhesive properties of the grafted PP.

| Weight of PPg in grams | REACTANT Type | Weight in grams | MR = [OH] [MA] | Peeling force on aluminium in daN/cm |
|---|---|---|---|---|
| 45 | — | 0 | 0 | 0.17 |
| 42.12 | PTMG Mn = 650 | 2.88 | 0.5 | 1.0 |
| 39.59 | " | 5.41 | 1.0 | 1.0 |
| 42.33 | PEG Mn = 600 | 2.67 | 0.5 | 1.47 |
| 41.50 | PEG Mn = 2,000 | 3.50 | 0.2 | 1.25 |

-continued

| Weight of PPg in grams | REACTANT Type | Weight in grams | $MR = \frac{[OH]}{[MA]}$ | Peeling force on aluminium in daN/cm |
|---|---|---|---|---|
| 37.18 | " | 7.82 | 0.5 | 1.87 |
|  |  |  | $MR = \frac{[NH_2]}{[MA]}$ |  |
| 44.03 | PA di NH$_2$ Mn = 1050 | 0.97 | 0.1 | 0.21 |
| 40.53 | " | 4.47 | 0.5 | 0.96 |

EXAMPLE 3

Maleic anhydride was grafted onto the copolymer lacqtene P 3050 MN4, defined in Example 2, as follows:
the following were introduced into an autoclave:
440 g of monochlorobenzene
96 g of 3050 MN4
48 g of maleic anhydride
8.2 g of benzoyl peroxide The mixture was maintained at a temperature of 130° for 2 hours. 1.0% grafted PPg was obtained, with a melt index of 70 at 230° C. under 5 kg.

The PPg was diluted with Lacqtene 3050 MN4, identical to that from which it has been produced, by feeding a 30 D single-screw extruder set at 200° C. with a mixture of 180 g of 3050 MN4 and 20 g of the PPg; after a residence time of two minutes, a liquid strand was produced which was solidified, cooled by passing into a water trough and granulated.

Similar tests were repeated except that there were added to the mixture:
either 1,6-hexanediol
a polyoxyethylene glycol of Mn=600 (PEG)
or the di-NH$_2$ PA oligomer of Mn=1,050, used in Example 2.

Adhesive bonded aluminum sheets were produced using granules of the composition produced. The peel strengths were determined and the results obtained are collated in the following Table.

| Adhesive composition in grams | | Compound R | | Molar ratio $MR = \frac{[OH]}{[MA]}$ | Peeling force on aluminium in daN/cm |
|---|---|---|---|---|---|
| PP | PPg | Type | Weight | | |
| 180 | 20 | — | 0 | 0 | 1.23 |
| 180 | 20 | hexanediol | 0.12 | 1 | 1.29 |
| 180 | 20 | " | 0.24 | 2 | 1.31 |
| 180 | 20 | PEG | 0.61 | 1 | 1.54 |
| | | | | $MR = \frac{[NH_2]}{[MA]}$ | |
| 180 | 20 | Pa di NH$_2$ | 2.14 | 2 | 1.54 |

EXAMPLE 4

Lacqtene P 3050 MN4 was modified by grafting as in Example 3, with 1.3% of maleic anhydride. The PPg obtained had a melt index of 70 at 230° C. under 5 kg.

The PPg obtained was then compounded for 10 minutes at 180° C. with an ethylene/vinyl acetate copolymer (28% vinyl acetate) which had been hydrolysed (EVA OH) to a molar equivalent of hydroxyl groups, measured by infrared analysis of 0.2 mole OH/100 g of resin.

| Weight of PPg in g | Weight of EVAOH in g | $MR = \frac{[OH]}{[MA]}$ | Peeling force on aluminium in daN/cm |
|---|---|---|---|
| 45.00 | 0 | 0 | 0.83 |
| 44.55 | 0.45 | 0.15 | 1.14 |
| 43.65 | 1.35 | 0.46 | 1.43 |
| 42.75 | 2.25 | 0.79 | 1.87 |

EXAMPLE 5

Maleic anhydride was grafted on to a propylene-/ethylene copolymer in a melt, in the following manner:
a laboratory single-screw extruder was fed with a mixture consisting of:
96 parts by weight of lacqtene P 3050 MN4
3 parts by weight of maleic anhydride
1 part by weight of tertiary butyl perbenzoate.

The running conditions were as follows:
screw speed: 40 revolutions/minute
temperature readings: 175° C. at the entry; 200° C. in the main body; 180° C. at the die.
residence time of the material: 40 seconds A 0.55% grafted PP was produced, the melt viscosity of which (measured at 220° C. at a shear rate of 1 s$^{-1}$ in the Rheomat 30 apparatus) was 23 Pa s.

As in Example 1, the PPg obtained was compounded in the tank of a Brabender mixer set at 220° C. for 10 minutes, with Lacqtene P 7091 (ATOCHEM's random propylene/ethylene copolymer with a melt index of 6 at 230° C. and under 2.16 kg), alone or with the addition of polyoxyethylene glycol of Mn=2,000.

| Adhesive composition in grams | | | Molar ratio $MR = \frac{[OH]}{[MA]}$ | Peeling force on aluminium in daN/cm |
|---|---|---|---|---|
| PP | PPg | PEG | | |
| 40 | 10 | 0 | 0 | 0.05 |
| 32 | 8 | 1.5 | 2 | 0.70 |

It was found that the addition of a small quantity of PEG increases the adhesion considerably.

EXAMPLE 6

A three-layer laminate consisting of the following was produced by coextrusion with three extruders:
Lacqtene P 3020 GN 3 (ATOCHEM's random propylene/ethylene copolymer with a melt index of 1.7 at 230° C. and 2.16 kg): thickness 0.8 mm
binder: thickness 0.1 mm
Eval ECF (ethylene/vinyl alcohol copolymer from Kuraray): thickness 0.2 mm.

The binder was obtained by extrusion. As stated above, one of the three extruders was fed with one of the following two mixtures:

Lacqtene P 7091 (defined in Example 4) 95 parts by weight grafted copolymer of Example 2, 5 parts by weight or Lacqtene P 7091, 95 parts by weight grafted copolymer of Example 2, 5 parts by weight hydrolysed EVA containing 28% acetate, defined in Example No. 4 (EVA OH), 0.25 part by weight the material has a residence time in the extruder of 3 minutes at a temperature of 200° C. in both cases.

Two three-layer laminates were manufactured in this manner and were used to measure the energy of separation between the binder and the Eval layer by means of T-peeling tests at ambient temperature with the aid of a tensometer at a speed of traction of 200 mm/minute.

The same peeling tests were carried out on the two laminates which have been calendered.

The results of the tests are shown on the following table.

| Binder type | Separation energy in daN/cm | |
|---|---|---|
| | Uncalendered laminate | Calendered laminate |
| P 7091 + PPg | 2.80 | 2.20 |
| P 7091 + PPg + EVA OH | Inseparable | 3.25 |

Here again, the advantageous effect of the addition of a hydroxylated compound on the adhesion can be seen.

What is claimed is:

1. An adhesive composition consisting essentially of the reaction product of (a) a polypropylene compound consisting of polypropylene modified by grafting thereto an unsaturated monomer bearing an acid anhydride group, with (b) a compound R, bearing at least two amine groups, which are reactive with the anhydride group, in an amount such that the molarity ratio, prior to formation of the reaction product and defined as the ratio of the number of reactive groups carried by the compound R to the number of anhydride groups carried by the grafted polypropylene, is from about 0.01 to about 5 and wherein compound R is at least one member selected from the group consisting of polyamines and oligomers or alpha, omega-diamino polyamides.

2. A composition according to claim 1 wherein the polypropylene is grafted with maleic anhydride.

3. A composition according to claim 1 wherein the compound R is a polyamine.

4. A composition according to claim 1 wherein compound R is an oligomer of alpha, omega-diamino polyamides.

5. A composition according to claim 1 wherein compound R is an oligomer of alpha, omega-diamino polyamide 11.

6. A composition according to claim 1 wherein compound R is an oligomer of alpha, omega-diamino polyamide 12.

7. A composition according to claim 1 wherein compound R is an oligomer of alpha, omega-diamino polyamide 16.

8. A process for the manufacture of a composition according to claim 1 wherein the grafted polypropylene is meltcompounded with the compound R.

9. A composite aluminum article comprising sheets of aluminum joined with a composition of claim 1.

10. A composite article comprising sheets of a polymeric composition joined with a composition of claim 1.

11. A composition of claim 2 wherein the compound R is a polyamine.

12. A composition of claim 2 wherein compound R comprises at least one member selected from the group consisting of oligomers of alpha, omega-diamino polyamide 11, alpha, omega-diamino polyamide 12 and alpha, omega-diamino polyamide 6.

13. A composition of claim 1 wherein the molarity ratio is from about 0.1 to about 2.

14. A composition of claim 2 wherein the molarity ratio is from about 0.1 to about 2.

* * * * *